United States Patent [19]

Vuagnat

[11] Patent Number: 5,022,763
[45] Date of Patent: Jun. 11, 1991

[54] RECEIVER FOR ROTATING LASERS USED FOR GUIDING MACHINES, PARTICULARLY PUBLIC WORKS MACHINES

[75] Inventor: Louis Vuagnat, Sainte Foy Les Lyon, France

[73] Assignee: GV S.A., France

[21] Appl. No.: 465,096

[22] PCT Filed: May 9, 1989

[86] PCT No.: PCT/FR89/00221

§ 371 Date: Jan. 9, 1990

§ 102(e) Date: Jan. 9, 1990

[87] PCT Pub. No.: WO89/11107

PCT Pub. Date: Nov. 16, 1989

[30] Foreign Application Priority Data

May 10, 1988 [FR] France ............... 88 06559

[51] Int. Cl.$^5$ .................. G01S 1/70; G05D 1/03
[52] U.S. Cl. .................. 356/400; 37/DIG. 20;
172/4.5; 250/239; 356/138
[58] Field of Search ............ 356/138, 141, 152, 153,
356/400; 250/239, 206, 206.1; 37/DIG. 20;
172/4.5

[56] References Cited

U.S. PATENT DOCUMENTS

| 3,209,148 | 9/1965 | Pavry et al. | 250/65 |
|---|---|---|---|
| 3,719,424 | 3/1973 | Weischedel | 356/141 |
| 3,887,012 | 6/1975 | Scholl et al. | 250/239 |
| 4,162,708 | 7/1979 | Johnson | 172/4.5 |
| 4,200,787 | 4/1980 | Carson | 172/4.5 |
| 4,700,301 | 10/1987 | Dyke | 364/424 |

FOREIGN PATENT DOCUMENTS

| 1211302 | 2/1966 | Fed. Rep. of Germany . |
| 3616269 | 1/1987 | Fed. Rep. of Germany . |
| 2089615 | 6/1982 | United Kingdom . |

OTHER PUBLICATIONS

Proceedings of the National Electronics Conference, 7-9 Dec., 1970, Chicago, Illinois, vol. XXVI, J. S. Miller et al.: "Application of Solar Aspect Sensors as Navigation Components", pp. 428-433.

Primary Examiner—F. L. Evans
Attorney, Agent, or Firm—Sughrue, Mion, Zinn Macpeak & Seas

[57] ABSTRACT

Receiver for rotating lasers used for guiding machines (for example public works machines), which comprises a receiver assembly proper (6) disposed on a support (9) enabling it to be fastened on the machine, a cell consisting essentially of plates (7) carrying photodiodes (8) and disposed around a fixed shaft in such a manner as to form a pillar enabling the passage of the beam to be detected over 360°, the assembly being protected by a peripheral shell (28) capped by a protective hood (27). The photodiode (8) plates (7) are three in number and are disposed vertically around a central support shaft to form between them an angle of 60° to one another, the mounting being effected in such a manner that they are detachable and their fastening being achieved with the aid of damping members disposed at each end of the plate support shaft (7) and around the latter.

4 Claims, 2 Drawing Sheets

RECEIVER FOR ROTATING LASERS USED FOR GUIDING MACHINES, PARTICULARLY PUBLIC WORKS MACHINES

The present invention relates to a new type of receiver for rotating lasers used for guiding machines in the field of public works, agriculture or even industry.

In the present description the invention will be described for a receiver used in the public works field, but this is not limitative and a receiver of this kind could also be used in any other field where similar problems arise.

In the field of public works, for leveling ground or adjusting the slope of a trench and the like, increasing use is being made of control means consisting of equipment making use of lasers.

FIG. 1 illustrates schematically the utilization of an instrument of this kind.

In general, for the purpose of bringing ground to a desired profile use is made of rotating lasers, which serve to guide the machine (2) semi-automatically or automatically. Arrangements of this kind consist essentially of a transmitter (3) comprising the actual laser transmitter mounted on a support and a receiver (4) which in turn is mounted on the actual machine. This receiver (4) comprises essentially:

receiver cells (5, 6) detecting the passage of the laser beam over 360°;
a telescopic or other mast M supporting said receiver;
a casing (7) permitting visual monitoring when the machine is operating semi-automatically, or a monitoring and automatic control casing permitting visual monitoring and automatic control;
supply cables and cables connecting the cell and the casing.

For the operation of arrangements of this kind it is possible to use either laser diode transmitters (invisible beam) or helium-neon laser transmitters (visible beam).

In a general way, lasers of this kind are used in electronic leveling instruments which, through the action of rotating the transmitter head (3), define a horizontal or non-horizontal reference plane P, or even a vertical plane. In all cases considered in the figures the position information is obtained by means of the cell (6) of the receiver (5), which may either be hand held or, preferably, mounted on a telescopic or other rod (M) fixed to the machine itself.

The present invention relates more particularly to an improvement made to receivers mounted on the machines.

Up to the present time the receivers used for applying this technique have essentially consisted of a pillar carrying an assembly comprising four sets of photosensitive elements disposed at right angles to one another in order to enable a range of 360° to be covered. The four plates are generally mounted permanently on an appropriate support and are difficult to detach, thus giving rise to a problem when one of them is broken or damaged. Receiver assemblies of this kind are therefore expensive to produce and in practice difficult to repair or maintain.

A new type of receiver has now been found and forms the subject of the present invention; this receiver makes it possible to solve these problems through the fact that it permits easy detachment of the plates supporting the photosensitive elements (photodiode). In addition, because of its very design, it allows the use of an assembly comprising only three photodiode support plates (instead of the four in receivers known hitherto), so that its cost is substantially reduced.

Finally, the receiver according to the invention makes it possible to prevent any damage which might be caused by vibrations or shocks occurring in the course of the use of the carrier machine.

In a general way, the invention therefore relates to an improvement made to receivers for rotating lasers used for guiding machines (for example public works machines) and which comprises (sic) a receiver cell mounted on a support enabling it to be fastened on a mast associated with the machine, this cell consisting essentially of a plurality of plates carrying photodiodes and disposed vertically in such a manner as to form a pillar enabling the passage of the beam to be detected over 360°, said assembly being protected by a peripheral shell. The receiver according to the invention is characterized in that the photodiode plates are three in number and are disposed vertically around a central shaft enabling them to be held relative to one another to form an angle of 60°, said plates being detachably mounted around this shaft and their fastening on their support casing, which enables the assembly to be fixed on the machine, being achieved with the aid of damping members disposed at each end of the plate support shaft and around the latter.

In addition, in a preferred embodiment of the invention:

the peripheral shell is capped by a protective hood projecting beyond the pheripheral shell and eliminating all risk of damage to said shell when the receiver is removed from the machine and laid on its side;

the casing supporting the receiver assembly is essentially in the form of a parallelepiped consisting of two parts articulated to one another, one part supporting the receiver proper and the other part being provided with means enabling said casing to be locked on a support pillar; in an embodiment of this kind the locking is advantageously effected by means of an assembly comprising a V-shaped part against which the support pillar will bear, the locking of the latter being effected by a presser member, whose action is controlled, disposed on the opposite face of the V.

The invention and the advantages which it provides will however be better understood with the aid of the example of embodiment given below by way of indication but without constituting a limitation, and illustrated by the accompanying drawings, in which.

Figure 2:
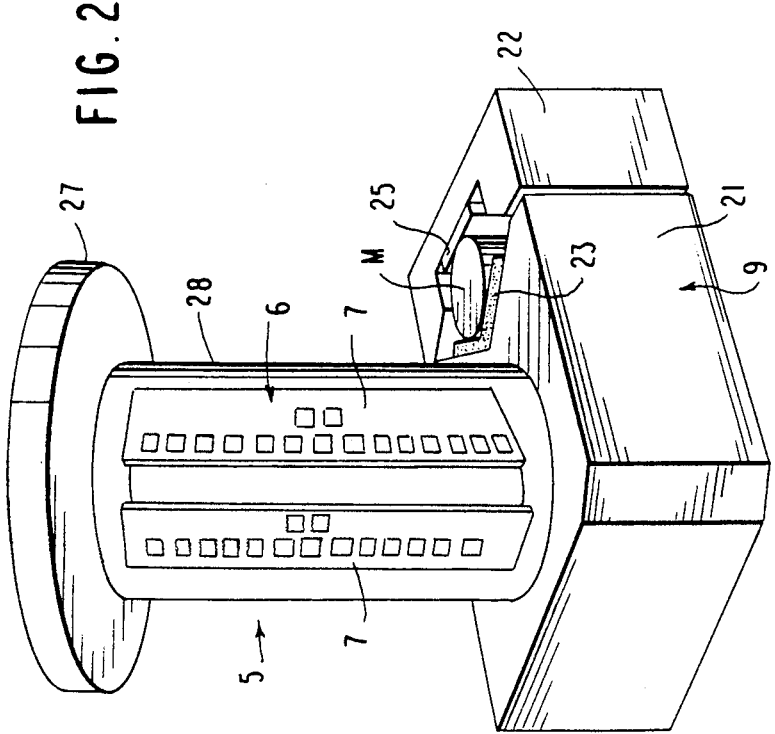
FIG. 2 is a schematic view in perspective of the receiver assembly according to the invention.

Referring to the accompanying figures, the receiver for rotating lasers according to the invention, which is given the general reference (5) (see FIG. 2) is essentially in the form of a receiver assembly proper (6) comprising plates (7) carrying photodiodes (8). This assembly is mounted in such a manner as to form a pillar on a support casing given the general reference (9), the assembly being protected by a peripheral shell (28) based on a material permeable to the laser beam and equipped with a polarizing or electronic filter.

Figure 3:
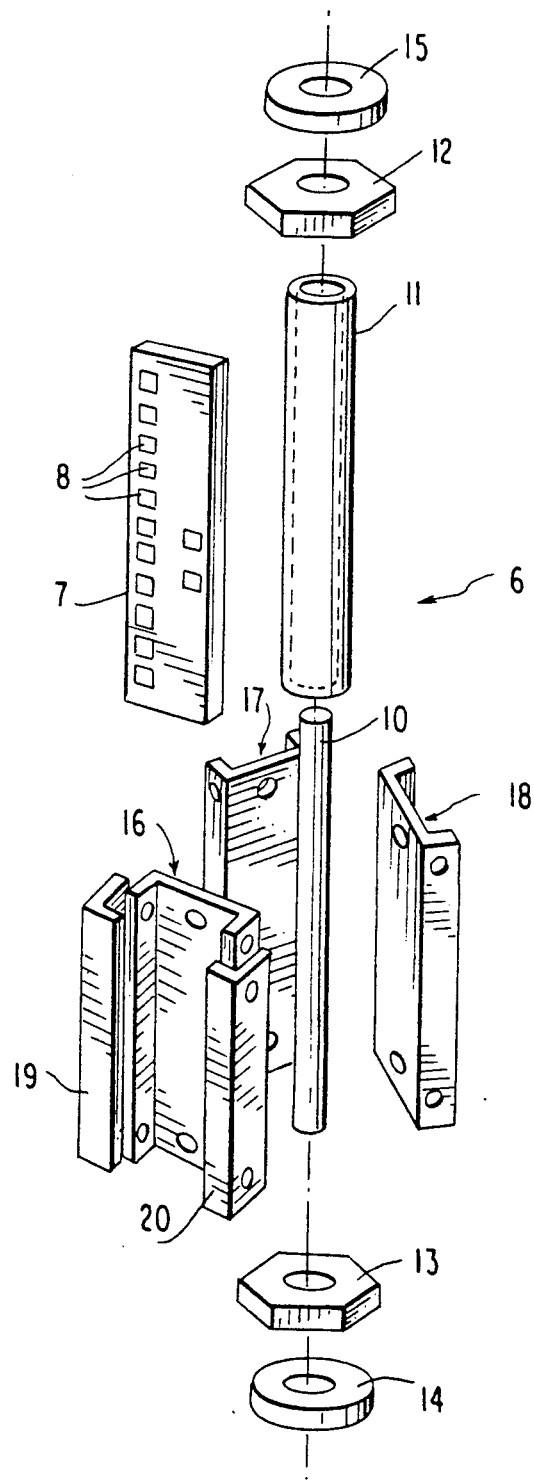
FIG. 3 is an exploded view showing the structure of a receiver assembly of this kind.

According to the invention, and as can be seen more particularly in FIG. 3, the receiver assembly (6) comprises essentially three photodiode plates (7) (only one of these plates being shown in FIG. 3), these plates being disposed around a central support shaft (10) securing them and forming between them an angle of 60° to one another. According to the invention the plates are fastened around the central shaft (10) in such a manner that not only are they mounted detachably but the entire assembly is damped. For this purpose, as can be seen in the accompanying FIG. 3, the central shaft (10) is surrounded by a layer of damping material (11) (for example a rubber tube), the shaft being held by two hexagonal struts (12, 13), and two top and bottom support damping members (14) and (15) respectively being disposed one at each end.

The hexagonal struts (12, 13) serve not only to hold identical U-shaped support plates (16, 17, 18), but also to effect perfect positioning of the photodiode plates (7) at 60° to one another. These plates (7) are held on the support members (16, 17, 18) by means of clamp angles (19, 20) locked laterally by means of screws against the side faces of the U-shaped supports. The projecting parts of the angles (19, 20) secure the plates (7) at their sides.

Figure 1:
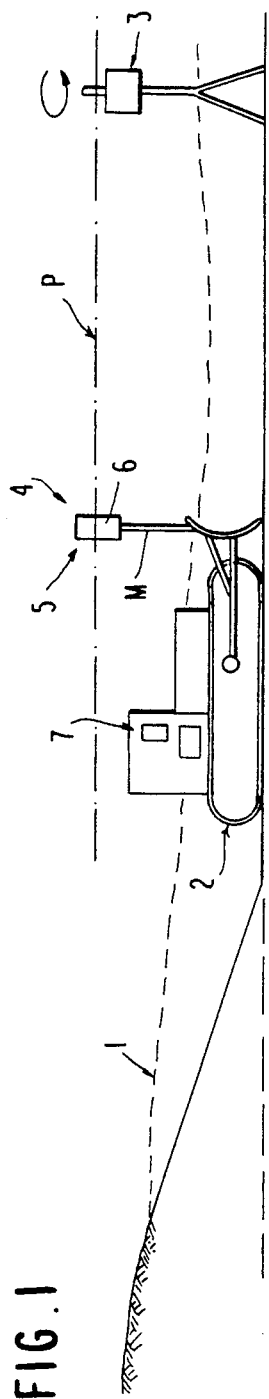
FIG. 1 is a schematic view of a rotating laser beam control system including a receiver forming a preferred embodiment of the invention.
Figure 4:
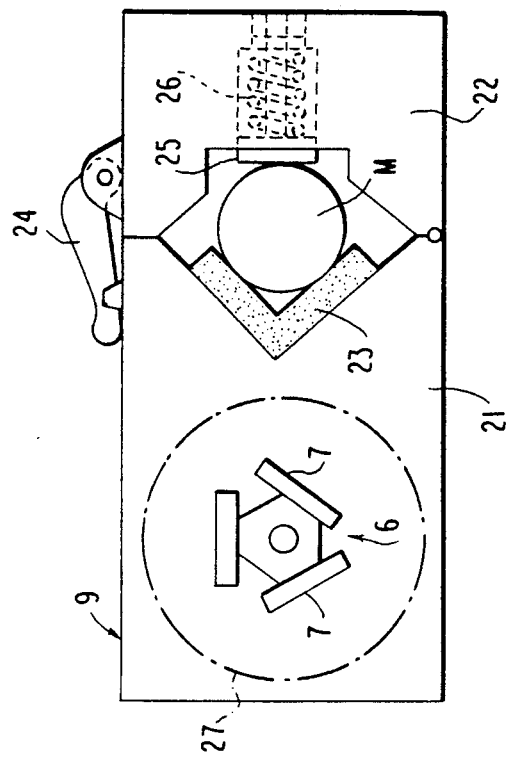
FIG. 4 is a top plan view illustrating one form of construction of the casing supporting the receiver and enabling it to be fastened on a mast associated with the machine.

An assembly of this kind is mounted on a support casing (9) of substantially parallelepipedic shape, which is essentially in the form of a block comprising two parts (21, 22), one part (21) supporting the actual receiver 6 and the other part (22), which is articulated relative to the first part, enabling said support to be locked on the holding pillar or mast (M) associated with the machine (see FIG. 1). In the preferred embodiment illustrated in FIGS. 2 and 3, in order to achieve not only perfect locking of the assembly around the pillar but also to damp shocks, locking is effected by providing on the part (21) of the support block a V-shaped zone against which the pillar (M) will bear. This V-shaped zone is covered with a layer of damping material (23), for example rubber. The assembly is clamped around the support pillar (M) on the one hand by means of a locking member (24) (for example a pivoting hook), and on the other hand by means of a presser system (25) consisting essentially of a shoe biased by a calibrated spring (26) which enables the pressure to be controlled. A casing of this kind thus enables the receiver to be easily installed and detached and in addition achieves perfect, precise positioning of the receiver around the support shaft (6) mounted on the machine.

Finally, the receiver (6) is capped by a protective hood (27) (see FIG. 2) projecting beyond the peripheral shell, its diameter advantageously being equal to the width of the support block. In this way, when the receiver is detached, it can be laid on its side without any risk of damage, because it will then be supported on the one hand on the block (9) and on the other hand on the periphery of the hood (27). Moreover, the protective hood (27) is screwed from the inside on the shaft (10), and for this purpose is provided with a blind tapped hole (not visible in the drawings), which thus does not extend to the top face, so that perfect leaktightness of the assembly is achieved. In addition, this leaktightness is also improved by the provision of additional seals (not shown), which are disposed at the two ends of the shell in order to eliminate any risk of infiltration of water or dust.

In comparison with laser receivers proposed hitherto, the invention offers numerous advantages through the fact that it not only makes it possible to detect the passage of the laser beam over 360° while using only three photodiode plates (instead of four as hitherto), but that in addition, through its design, it permits easy detachment of the photodiode plates for the purpose of their replacement in the event of their being damaged or suffering deterioration. Furthermore, since the entire assembly is mounted on damping blocks, the vibrations transmitted by the machine in normal use will not disturb the operation of the assembly. Finally, as the receiver (6) is mounted eccentrically on the support casing (9), relative to its mounting axis on the machine, it is possible, by simple pivoting, to dispose it either on the outside of the machine, or in the inside if there is any risk of collision or shocks (for example when working inside a building).

The invention is obviously not restricted to the example of embodiment described above, but covers all variants thereof which are based on the same principle.

I claim:

1. In a receiver for rotating beam lasers for guiding a machine, said receiver comprising: a receiver assembly (6) disposed on a support (9) for fastening said receiver assembly on the machine, said receiver assembly consisting essentially of plates (7) carrying photodiodes (8) disposed around a fixed shaft to form a pillar such that the laser beam can be detected over 360°, and a peripheral shell (28) capped by a protective hood (27) about said receiver assembly, the improvement wherein the photodiode (8) plates (7) are three in number, disposed vertically around a vertical, central support shaft forming an angle of 60° to one another, means for detachably mounting said plates (7) to said shaft (10) and damping members disposed at each end of the plate support shaft (10) and around the shaft (10).

2. Receiver for rotating beam lasers according to claim 1, wherein the peripheral shell (28) is capped by a protective bond (27) which projects beyond the peripheral shell (28) and eliminates all risk of damage to said shell when the receiver is removed and laid on its side.

3. Receiver for rotating beam lasers according to claim 1, wherein the support (9) supporting the receiver assembly (6) is essentially in the form of a parallelepiped casing consisting of two parts (21, 22) articulated to one another, one part (21) supporting the receiver assembly and the other part (22) being provided with means for locking said casing onto a support mast (M).

4. Receiver for rotating lasers according to claim 3, wherein the locking means of the casing on the support mast (M) is effected by means of an assembly comprising a V-shaped part which bears against the mast (M), said V-shaped part being covered with a layer of damping material (23), and the clamping of the assembly around the support mast (M) being achieved by a pivoting hook locking member (24), and a presser mechanism (25) consisting essentially of a shoe biased by a calibrated spring (26) enabling the pressure to be controlled.

* * * * *